United States Patent
Fagerstrom et al.

(10) Patent No.: US 11,542,859 B2
(45) Date of Patent: Jan. 3, 2023

(54) AIR COOLER WITH WATER SEPARATOR

(71) Applicant: L & M Radiator, Inc., Hibbing, MN (US)

(72) Inventors: Kyle A. Fagerstrom, Chisholm, MN (US); Kerry Hecimovich, Hibbing, MN (US); Robert Janezich, Hibbing, MN (US); Nicholas F. Takes, Hermantown, MN (US)

(73) Assignee: L & M Radiator, Inc., Hibbing, MN (US)

(*) Notice: Subject to any disclaimer, the term of this patent is extended or adjusted under 35 U.S.C. 154(b) by 77 days.

(21) Appl. No.: 16/937,650

(22) Filed: Jul. 24, 2020

(65) Prior Publication Data

US 2022/0025811 A1 Jan. 27, 2022

(51) Int. Cl.
*F02B 29/04* (2006.01)
*F28F 17/00* (2006.01)
*B01D 53/26* (2006.01)
*F28D 21/00* (2006.01)

(52) U.S. Cl.
CPC ........ *F02B 29/0468* (2013.01); *B01D 53/265* (2013.01); *F28F 17/005* (2013.01); *F28D 2021/0082* (2013.01)

(58) Field of Classification Search
CPC .. F02B 29/0468; B01D 53/265; F28F 17/005; F28D 2021/0082
See application file for complete search history.

(56) References Cited

U.S. PATENT DOCUMENTS

| 7,921,905 B2 * | 4/2011 | Baylis | F02B 29/0462 |
| | | | 165/172 |
| 2018/0133634 A1 * | 5/2018 | Zager | F25B 9/004 |
| 2018/0361289 A1 | 12/2018 | Suzuki et al. | |

FOREIGN PATENT DOCUMENTS

| DE | 3933484 C1 * | 4/1991 | ............. B01D 45/04 |
| DE | 3933484 C1 | 4/1991 | |
| EP | 1724453 A1 * | 11/2006 | ............ F02B 37/005 |
| EP | 1724453 B1 | 11/2008 | |

OTHER PUBLICATIONS

Nov. 17, 2021—(WO) International Search Report & Written Opinion—App. No. PCT/US2021/042958.

* cited by examiner

*Primary Examiner* — Jacob M Amick
*Assistant Examiner* — Charles J Brauch
(74) *Attorney, Agent, or Firm* — Banner & Witcoff, Ltd.

(57) ABSTRACT

An air cooler assembly includes an air cooler having an air inlet manifold, an air outlet manifold, and a heat exchanger core connected at a first end thereof to the air inlet manifold and at a second end thereof to the air outlet manifold. A water separator includes a chamber having a first end and an opposed second end, an air inlet proximate the first end and connected to the air outlet manifold, and an air outlet proximate the second end. A water outlet is formed in a bottom surface of the chamber, and a channel is positioned beneath the water outlet. A condensate outlet is positioned on a bottom surface of the channel. A helical blade has a first end and a second end, and is positioned within the chamber between the air inlet and the air outlet.

18 Claims, 5 Drawing Sheets

AIR COOLER WITH WATER SEPARATOR

FIELD

Aspects of this invention relate generally to an air cooler with a water separator, and, in particular, to an air cooler with a water separator that includes a helical blade.

BACKGROUND

An air cooler, for example a charge air cooler, which may also be referred to as an intercooler or an aftercooler, may be used on engines, such as diesel engines, to cool engine air that has passed through the compressor (e.g., turbocharger or supercharger) before it enters the intake manifold and cylinders of the engine.

Turbo chargers compress air to increase power and efficiency. To further increase power and meet emission standards, that air needs to be cooled. This hot air may contain large quantities of moisture vapor which, as it condenses, contributes to corrosion, scale build-up, washing out of lubricant and possible freezing issues.

It would be desirable to provide an air cooler that reduces or overcomes some or all of the difficulties inherent in prior known devices. Particular advantages will be apparent to those skilled in the art, that is, those who are knowledgeable or experienced in this field of technology, in view of the following disclosure of the invention and detailed description of certain embodiments.

Particular objects and advantages of the invention will be apparent to those skilled in the art, that is, those who are knowledgeable or experienced in this field of technology, in view of the following disclosure of the invention and detailed description of certain preferred embodiments.

SUMMARY

Aspects of the present invention may be used to advantageously provide an air cooler with a water separator that improves the separation of water from the air stream before it enters the intake manifold and cylinders of an engine. The separation of water from the air stream may also be beneficial in other compressed air applications.

In accordance with a first aspect, an air cooler assembly includes an air cooler having an air inlet manifold, an air outlet manifold, and a heat exchanger core connected at a first end thereof to the air inlet manifold and at a second end thereof to the air outlet manifold. A water separator includes a chamber having a first end and an opposed second end, an air inlet proximate the first end and connected to the air outlet manifold, and an air outlet proximate the second end. A water outlet is formed in a bottom surface of the chamber, and a channel is positioned beneath the water outlet. A condensate outlet is positioned on a bottom surface of the channel. A helical blade has a first end and a second end, and is positioned within the chamber between the air inlet and the air outlet.

In accordance with another aspect, an air cooler assembly includes an air cooler having an air inlet manifold, an air outlet manifold, and a heat exchanger core connected at a first end thereof to the air inlet manifold and at a second end thereof to the air outlet manifold. A water separator assembly includes a chamber having a first end and an opposed second end, an air inlet proximate the first end and connected to the air outlet manifold and extending substantially vertically, and an air outlet proximate the second end. The air outlet is formed of a first portion extending downwardly and outwardly from the chamber and has a first end positioned within the chamber and an opposed second end. A second portion is connected to the first end of the first portion and extends substantially horizontally. A water outlet including a plurality of slots is formed in a bottom of the chamber. A channel is positioned beneath the water outlet, and a condensate outlet extends downwardly and outwardly from a bottom surface of the channel. A helical blade has a first end and a second end, and is positioned within the chamber between the air inlet and the air outlet. A first end surface of the helical blade defines a first plane that extends substantially vertically within the chamber, and a second end surface defines a second plane that extends substantially vertically within the chamber. An interior edge of the helical blade defines a central aperture that extends along a longitudinal axis of the chamber, and an exterior edge of the helical blade extends along an interior surface of the chamber.

From the foregoing disclosure, it will be readily apparent to those skilled in the art, that is, those who are knowledgeable or experienced in this area of technology, that preferred embodiments of an air cooler as disclosed herein provide a significant technological advance in terms of improved removal of condensed water. These and additional features and advantages will be further understood from the following detailed disclosure of certain preferred embodiments.

Figure 1:
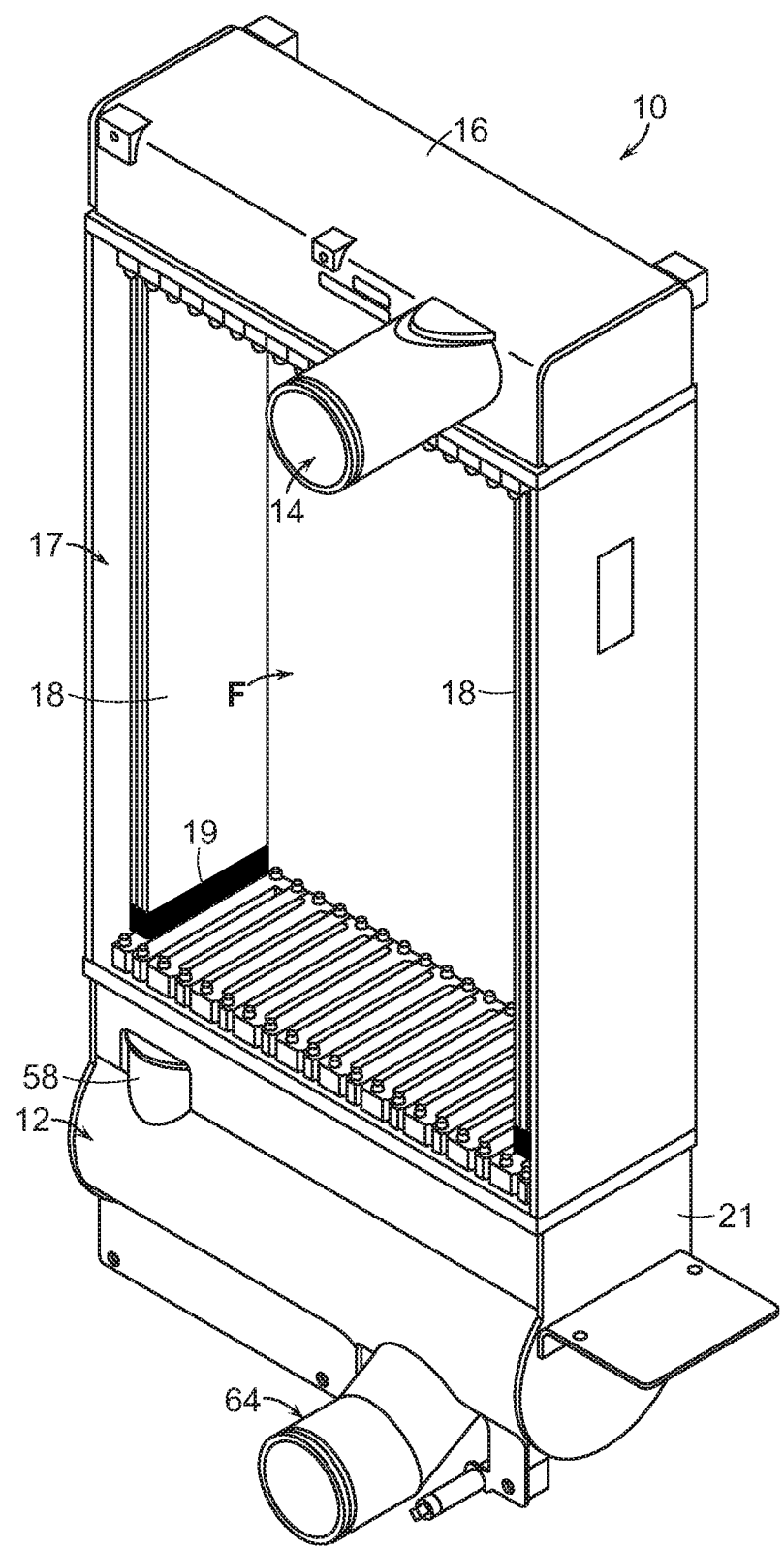
FIG. 1 is a schematic perspective view, shown partially assembled, of an air cooler and a water separator connected to the air cooler.
Figure 2:
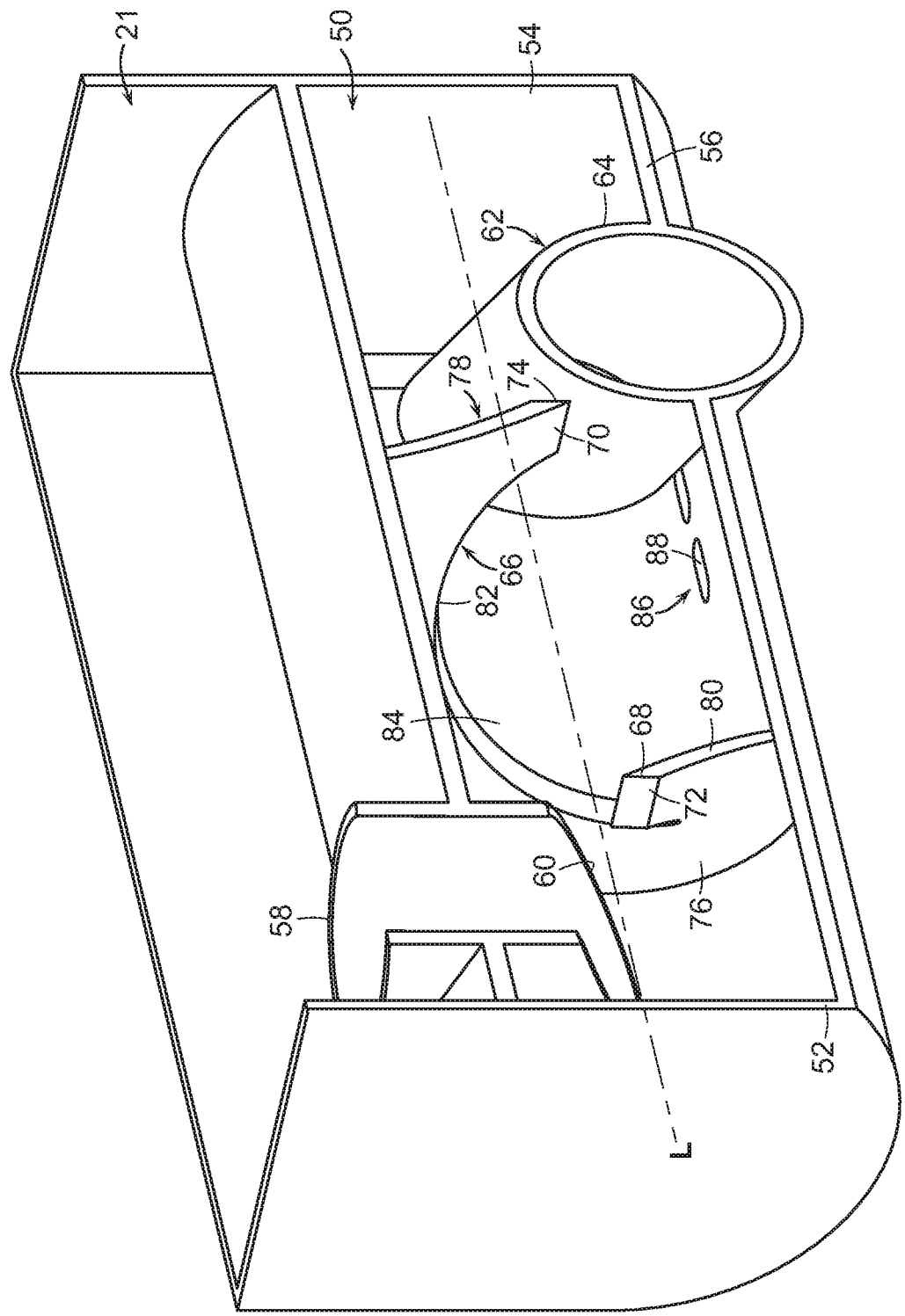
FIG. 2 is a schematic perspective view, shown partially broken away, of the water separator connected to an air chamber outlet of the air cooler of FIG. 1.

The figures referred to above are not drawn necessarily to scale and should be understood to provide a representation of the invention, illustrative of the principles involved. Some features of the air cooler depicted in the drawings have been enlarged or distorted relative to others to facilitate explanation and understanding. The same reference numbers are used in the drawings for similar or identical components and features shown in various alternative embodiments. Air coolers as disclosed herein would have configurations and components determined, in part, by the intended application and environment in which they are used.

DETAILED DESCRIPTION OF CERTAIN PREFERRED EMBODIMENTS

The present invention may be embodied in various forms. An embodiment of an air cooler 10 with a water separator 12 connected thereto is shown in FIG. 1. Air cooler 10 may be a charge air cooler, for example. Air cooler 10 may be used, for example, to cool hot compressed air discharged from an engine turbocharger before it enters the intake manifold and cylinders of the engine. It is to be understood, however, that the air cooler is not limited to use in cooling hot air in engines, and may easily be used with fluids or gases in other fields.

For convenience, the terms "upper" and "lower" and "top" and "bottom" are used herein to differentiate between the upper and lower ends of the air cooler and particular elements. It is to be appreciated that "upper" and "lower" and "top" and "bottom" are used only for ease of description and understanding and that they are not intended to limit the possible spatial orientations of the air cooler or its components during assembly or use.

Air cooler 10 may include an air chamber inlet 14 that allows heated air to be introduced into an inlet manifold 16. Heated air may then pass from inlet manifold 16 through a heat exchanger core 17. In the illustrated embodiment, heat exchanger core 17 includes a plurality of flow tubes 18 with fins 19 on exterior surfaces thereof. For clarity purposes, only two finned flow tubes 18 are shown in FIG. 1. It is to be appreciated that other types of heat exchanger cores may be used to cool the heated air entering inlet manifold 16 through air inlet 14. For example, in certain embodiments, flow tubes 18 could be provided without fins. Other exemplary heat exchanger cores include U-tube, single pass and double pass, and bar and plate heat exchanger cores. Other suitable heat exchanger cores will become readily apparent to those skilled in the art, given the benefit of this disclosure.

Cool air may be directed in the direction of flow arrow F across an exterior of the plurality of finned flow tubes 18. It is to be appreciated that the flow of air across flow tubes may be created by a fan (not shown), or by natural convection. It is also to be appreciated that the direction of flow arrow F can extend in any direction. The air flowing through finned tubes 18, which has been cooled by the air passing over the exterior surfaces of finned flow tubes 18, may then pass to an outlet manifold 21, and then from outlet manifold 21 on to water separator 12 through an air inlet 58 described below.

The cooled air leaving air cooler 10 by way of air outlet manifold 21 and entering water separator 12 may include water, which, as noted above, can be harmful to the engine. As the stream of air and water passes through water separator 12, the water may be removed, thereby preventing water from entering the engine.

Water separator 12 and its components may be formed of a non-corrosive material. Water separator may be formed of a resin or plastic, or of metal. Exemplary metals include aluminum and stainless steel. Other suitable materials for water separator 12 will become readily apparent to those skilled in the art, given the benefit of this disclosure.

As illustrated in FIGS. 2-6, water separator 12 may include a chamber 50 having a first end 52, an opposed second end 54, and a sidewall 56 extending between first end 52 and second end 54. In certain embodiments, chamber 50 may be substantially cylindrical in cross-section.

The term "substantially", as used herein, is meant to mean mostly, or almost the same as, within the constraints of sensible commercial engineering objectives, costs, manufacturing tolerances, and capabilities in the field of water separator manufacturing and use. Similarly, the term "approximately" as used herein is meant to mean close to, or about a particular value, within the constraints of sensible commercial engineering objectives, costs, manufacturing tolerances, and capabilities in the field of water separator manufacturing and use.

Figure 4:
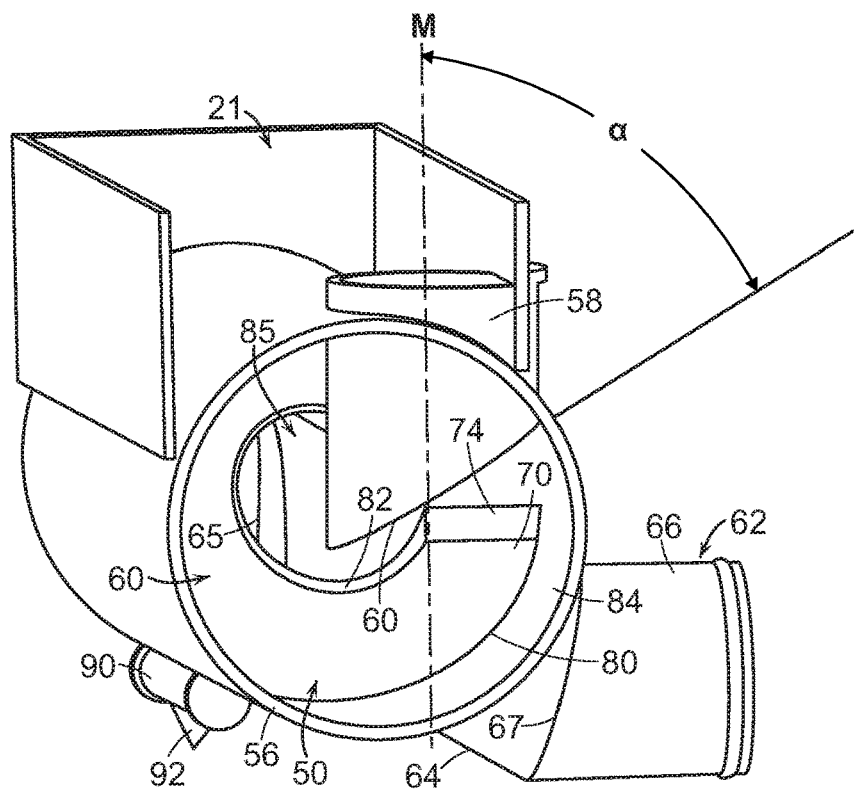
FIG. 4 is an end elevation view, partially in section, of the water separator and air chamber outlet of FIG. 1.

An air inlet 58 may be positioned proximate first end 52 of chamber 50, and may be connected to outlet manifold 21 of air cooler 10 such that chamber 50 is in fluid communication with heat exchanger core 17 air cooler 10. The cooled air passing out of heat exchanger core 17 through outlet manifold 21 may enter chamber 50 of water separator 12 through air inlet 58. Air inlet 58 may be substantially cylindrical in cross-section and may extend substantially vertically. It is to be appreciated that air inlet 58 may have any cross-sectional shape, and may be oriented in any desired direction. In certain embodiments, as illustrated in FIG. 4, a lower surface 60 of air inlet 58 may define a plane that is at an angle α with respect to longitudinal axis M of air inlet 58, which is oriented in a vertical direction in this embodiment. In certain embodiments, angle α may be approximately 45°, however, it is to be appreciated that angle α may have any value.

Chamber 50 may also include an air outlet 62 positioned proximate second end 54, and air may exit chamber 50 through air outlet 62. In certain embodiments, air outlet 62 may be substantially cylindrical in cross-section. It is to be appreciated that air outlet 62 may have any cross-sectional shape.

Figure 5:
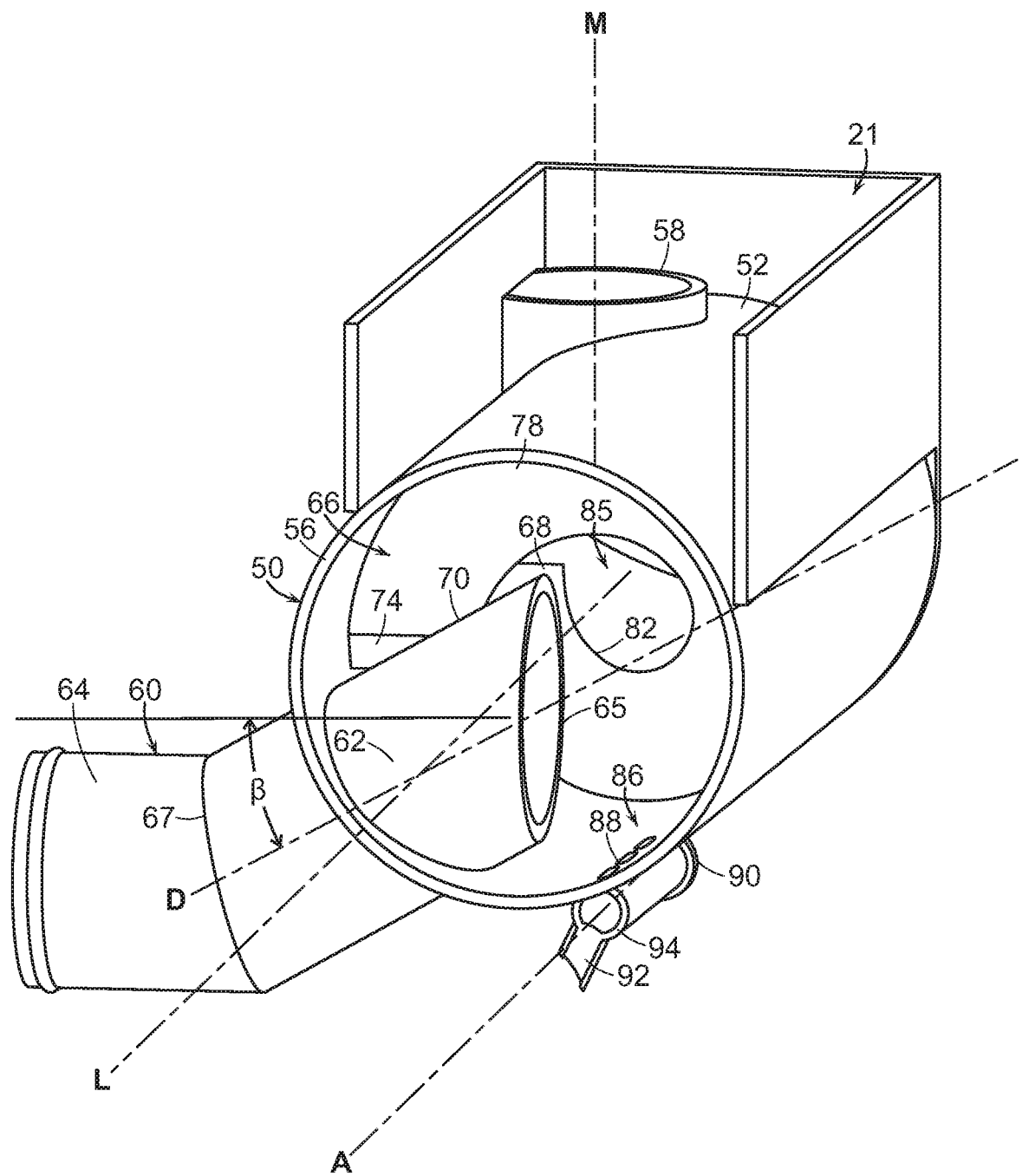
FIG. 5 is a rear perspective view, partially in section, of the water separator and air chamber outlet of FIG. 1.
Figure 6:
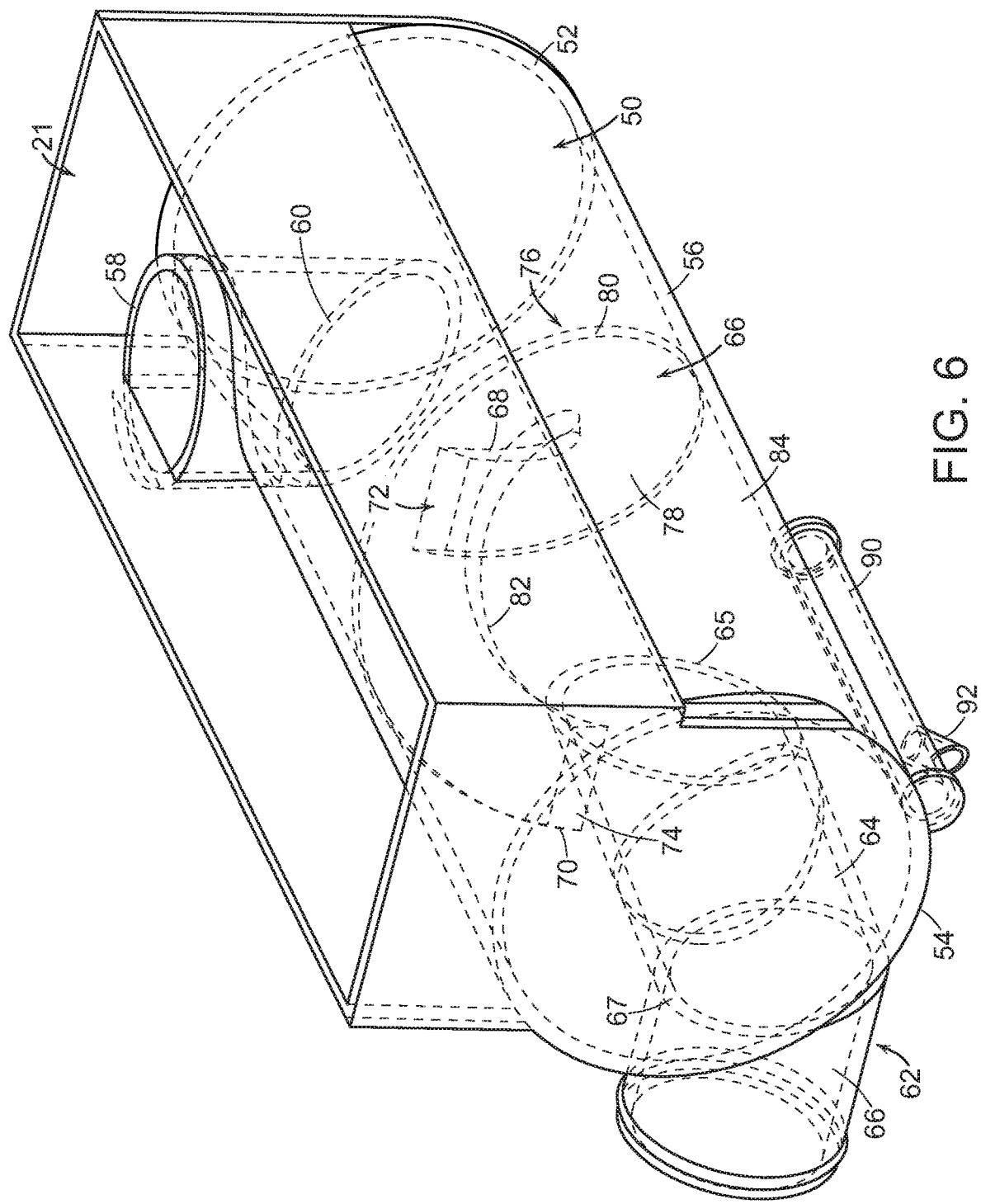
FIG. 6 is a schematic rear perspective view of the water separator and air chamber outlet of FIG. 1.

As seen in FIG. 5, air outlet 62 may be formed of a first portion 64 having a first end 65 and an opposed second end 67. First portion 64 may extend from an interior of chamber 50 downwardly and outwardly through sidewall 56. A longitudinal axis D of first portion 64 may extend downwardly and outwardly at an angle β with respect to horizontal, as seen in FIG. 6. In certain embodiments, angle β may be approximately 45°. First end 65 of first portion 64 may be positioned within chamber 50 and may define a plane that extends substantially vertically. Second portion 66 may be connected to second end 67 of first portion 64 and extend substantially horizontally. It is to be appreciated that in other embodiments, air outlet 62 may be formed of a single portion, and may be oriented at any desired angle.

A helical blade 66 may be positioned within chamber 50, and may have a first end 68 and an opposed second end 70. First end 68 of helical blade 66 may, in certain embodiments, be positioned downstream of air inlet 58. In other embodiments, first end 68 may be positioned upstream of air inlet 58, while in other elements it may be positioned at air inlet 58. Second end 70 of helical blade 66 may, in certain embodiments, be positioned upstream of air outlet 62. In other embodiments, second end 70 may be positioned downstream of air outlet 62, while in other elements it may be positioned at air outlet 62.

In certain embodiments, first end 68 of helical blade 66 may have a first end surface 72 that extends substantially horizontally, and defines a first plane that extends substantially vertically within chamber 50. It is to be appreciated that in other embodiments first end 68 may have any desired orientation. Similarly, second end 70 of helical blade 66 may have a second end surface 74 that extends substantially horizontally, and defines a second plane that extends substantially vertically within chamber 50. It is to be appreciated that in other embodiments second end 70 may have any desired orientation.

Helical blade 60 may have a first surface 76, an opposed second surface 78, an exterior edge 80 extending between first surface 76 and second surface 78 from first end 68 to second end 70, and an opposed interior edge 82 extending between first surface 76 and second surface 78 from first end 68 to second end 70. In certain embodiments, exterior edge 80 may be in contact with an interior surface 84 of chamber 50. Exterior edge 80 may be directly secured to interior surface 84 of chamber 50, such as by welding, for example. In certain embodiments, exterior edge 80 may be spot or stitched welded at a plurality of points along its length, while in other embodiments, exterior edge 80 may be welded along an entirety of its length. As seen in FIG. 5, interior edge 82 of helical blade 60 may define a substantially cylindrical central channel 85 extending along an entire length of helical blade 60 coaxially with longitudinal axis L of helical blade 60.

In the illustrated embodiment, first surface 76 and opposed second surface 78 of helical blade may be wound clockwise from first end 68 toward second end 70. In other embodiments, first surface 76 and opposed second surface 78 of helical blade may be wound counterclockwise from first end 68 toward second end 70. In certain embodiments, each of exterior edge 80 and interior edge 82 of helical blade 60 may complete a full revolution between first end 68 and second end 70 of helical blade 60. It is to be appreciated that in other embodiments, exterior edge 80 and interior edge 82 may complete more or less than a full revolution between first end 68 and second end 70 of helical blade 60.

A water outlet 86 may be positioned at a bottom of chamber 50 proximate second end 74 of helical blade 66 and proximate air outlet 62, and serves to allow water to drain from chamber 50. In certain embodiments, water outlet 86 may be in the form of a plurality of apertures or slots 88 extending through sidewall 56, which allow water to drain out of chamber 50. In certain embodiments, slots 88 may be racetrack shaped. Slots 88 may be collinear and have a common longitudinal axis S that extends substantially parallel to a longitudinal axis L of chamber 50. It is to be appreciated that water outlet 86 can take any desired form including, for example, a screen or a perforated plate.

A gutter or channel 90 may be secured to a bottom of chamber 50 beneath grate 86. Channel 90 may have a substantially cylindrical cross-section in certain embodiments, with a longitudinal axis A that extends substantially parallel to longitudinal axis L of chamber 50. It is to be appreciated that channel 90 may have any desired cross-sectional shape.

A condensate outlet 92 may be connected to an outlet opening 94 on a bottom of channel 90, allowing water to be drained out of channel 90. In certain embodiments, condensate outlet 92 may have a substantially cylindrical cross-section. It is to be appreciated that condensate outlet 92 may have any desired cross-sectional shape.

Figure 3:
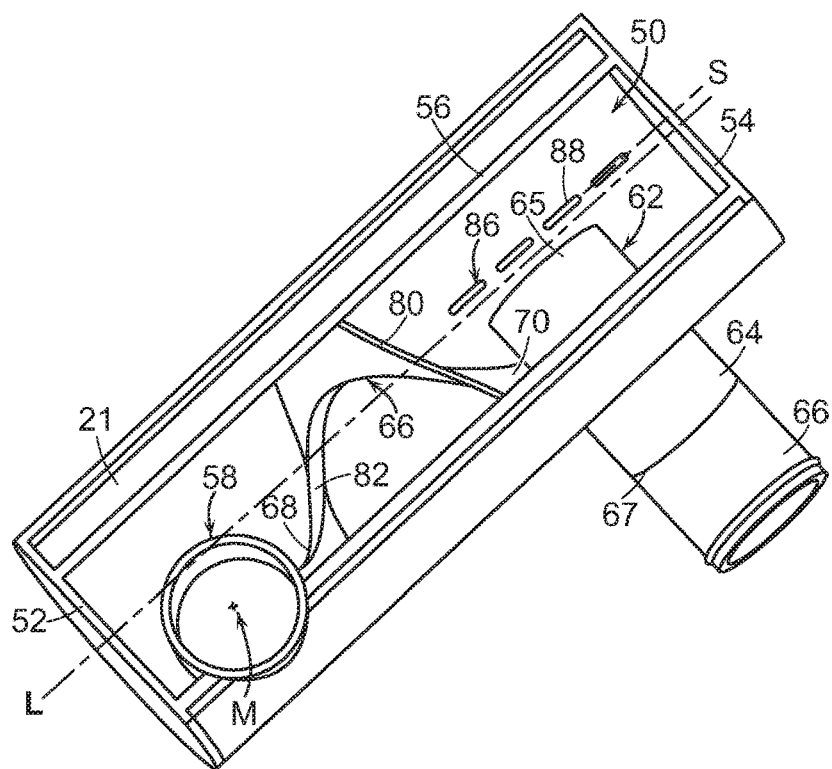
FIG. 3 is a side elevation view, partially in section, of the water separator and air chamber outlet of FIG. 1.

As illustrated in FIG. 3, in certain embodiments, air outlet 62 may be positioned along longitudinal axis L of chamber 50 proximate a midpoint of grate 86, and channel 90.

As the heated air moves through chamber 50, it is redirected by helical blade 66, helping to remove moisture from the air. As the air moves along the surface of helical blade 66 and through central aperture 85, the heavier drops of moisture fall off the interior edge 82 of helical blade 66, and pass through water outlet 86 into channel 90.

As seen in FIGS. 4 and 6, air inlet 58 may be positioned with chamber 50 such that its longitudinal axis M is spaced from longitudinal axis L of chamber 50 and proximate sidewall 56, which helps introduce spin to the air flowing into chamber 50, directing it along sidewall 56 and along helical blade 66.

As seen in FIG. 4, first end 65 of first portion 64 of air outlet 62 may be positioned in a central portion of chamber 50 proximate longitudinal axis L, which can help prevent moisture from chamber 50 entering air outlet 62 as the air leaves chamber 50.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. An air cooler assembly comprising:
    an air cooler including an air inlet manifold, an air outlet manifold, and a heat exchanger core connected at a first end thereof to the air inlet manifold and at a second end thereof to the air outlet manifold; and
    a water separator assembly comprising:
        a chamber having a first end and an opposed second end, an air inlet proximate the first end and connected to the air outlet manifold, and an air outlet proximate the second end;
        a water outlet formed in a bottom surface of the chamber;
        a helical blade having a first end and a second end, and positioned within the chamber between the air inlet and the air outlet; and
        a channel positioned beneath the water outlet and a condensate outlet on a bottom surface of the channel, the air outlet being positioned along a longitudinal axis of the chamber proximate a midpoint of a length of the channel.

2. The air cooler assembly of claim 1, wherein the first end of the helical blade is downstream of the air inlet, the second end of the helical blade is upstream of the air outlet.

3. The air cooler assembly of claim 1, wherein the condensate outlet extends downwardly and outwardly from the channel.

4. The air cooler assembly of claim 1, wherein the air inlet extends substantially vertically.

5. The air cooler assembly of claim 4, wherein a longitudinal axis of the air inlet is spaced from a longitudinal axis of the chamber and is proximate a sidewall of the chamber.

6. The air cooler assembly of claim 1, wherein the air inlet comprises a cylinder extending substantially vertically, a bottom surface of the cylinder defining a plane that is at an angle of approximately 45° with respect to vertical.

7. The air cooler assembly of claim 1, wherein the air outlet comprises:
    a first portion having a first end positioned in the chamber and a second end, and extending downwardly and outwardly from the chamber; and
    a second portion extending horizontally from the second end of the first portion.

8. The air cooler assembly of claim 7, wherein the first end is positioned in a central portion of the chamber proximate a longitudinal axis of the chamber.

9. The air cooler assembly
    of claim 1, wherein each of a first edge and an opposed second edge of the helical blade completes a full revolution between the first end of the helical blade and the second end of the helical blade.

10. The air cooler assembly of claim 1, wherein a surface of the helical blade is wound clockwise from the first end of the helical blade to the second end of the helical blade.

11. The air cooler assembly of claim 1, wherein an exterior edge of the helical blade is in contact with an interior surface of the chamber.

12. The air cooler assembly of claim 11, wherein the exterior edge of the helical blade is secured to the interior surface of the chamber.

13. The air cooler assembly of claim 1, wherein an interior edge of the helical blade defines a cylindrical central channel extending longitudinally along the chamber.

14. The air cooler assembly of claim 1, wherein the water outlet comprises a plurality of slots formed in a bottom of the chamber.

15. The air cooler assembly of claim 14, wherein each of the slots has a longitudinal axis, the longitudinal axis of each of the slots being collinear with one another and with a longitudinal axis of the chamber.

16. The air cooler assembly of claim 1, wherein the chamber has a cylindrical cross-section.

17. The air cooler assembly of claim 1, wherein the helical blade includes a first end surface that extends substantially horizontally, and defines a first plane that extends substantially vertically within the chamber, and a second end surface that extends substantially horizontally, and defines a second plane that extends substantially vertically within the chamber.

18. An air cooler water separator assembly comprising:
an air cooler including an air inlet manifold, an air outlet manifold, and a heat exchanger core connected at a first end thereof to the air inlet manifold and at a second end thereof to the air outlet manifold; and
a water separator assembly comprising:
a chamber having a first end and an opposed second end, an air inlet proximate the first end and connected to the air outlet manifold and extending substantially vertically, and an air outlet proximate the second end, the air outlet formed of a first portion extending downwardly and outwardly from the chamber and having a first end positioned within the chamber and an opposed second end, and a second portion connected to the first end of the first portion and extending substantially horizontally;
a water outlet including a plurality of slots formed in a bottom surface of the chamber;
a channel positioned beneath the water outlet;
a condensate outlet extending downwardly and outwardly from a bottom surface of the channel; and
a helical blade having a first end and a second end, and positioned within the chamber between the air inlet and the air outlet, wherein a first end surface of the helical blade defines a first plane that extends substantially vertically within the chamber, a second end surface defines a second plane that extends substantially vertically within the chamber, an interior edge of the helical blade defines a central aperture that extends along a longitudinal axis of the chamber, and an exterior edge of the helical blade extends along an interior surface of the chamber.

* * * * *